B. E. Parkhurst,
Circular Saw Mill.
N° 13,399.    Patented Aug. 7, 1855.
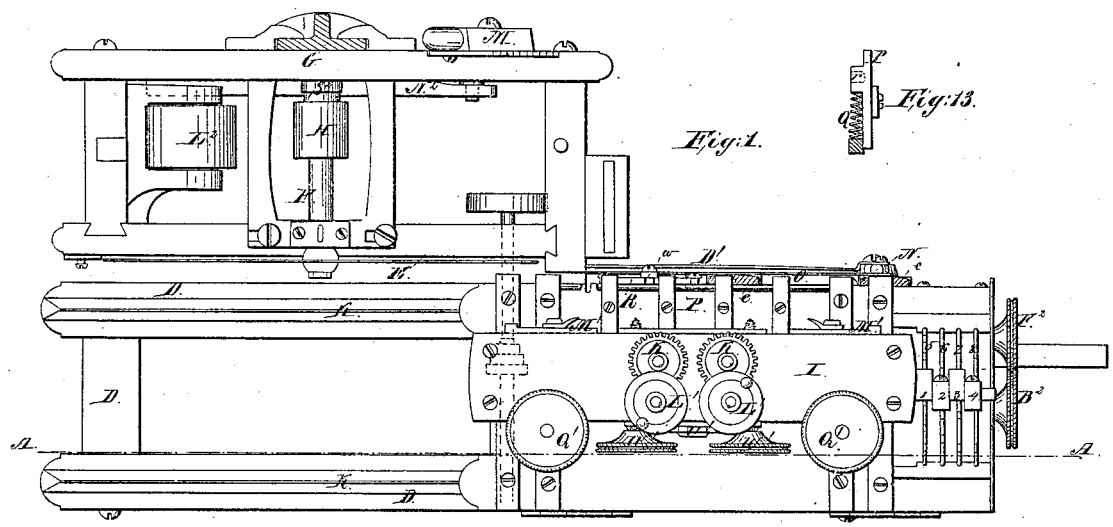
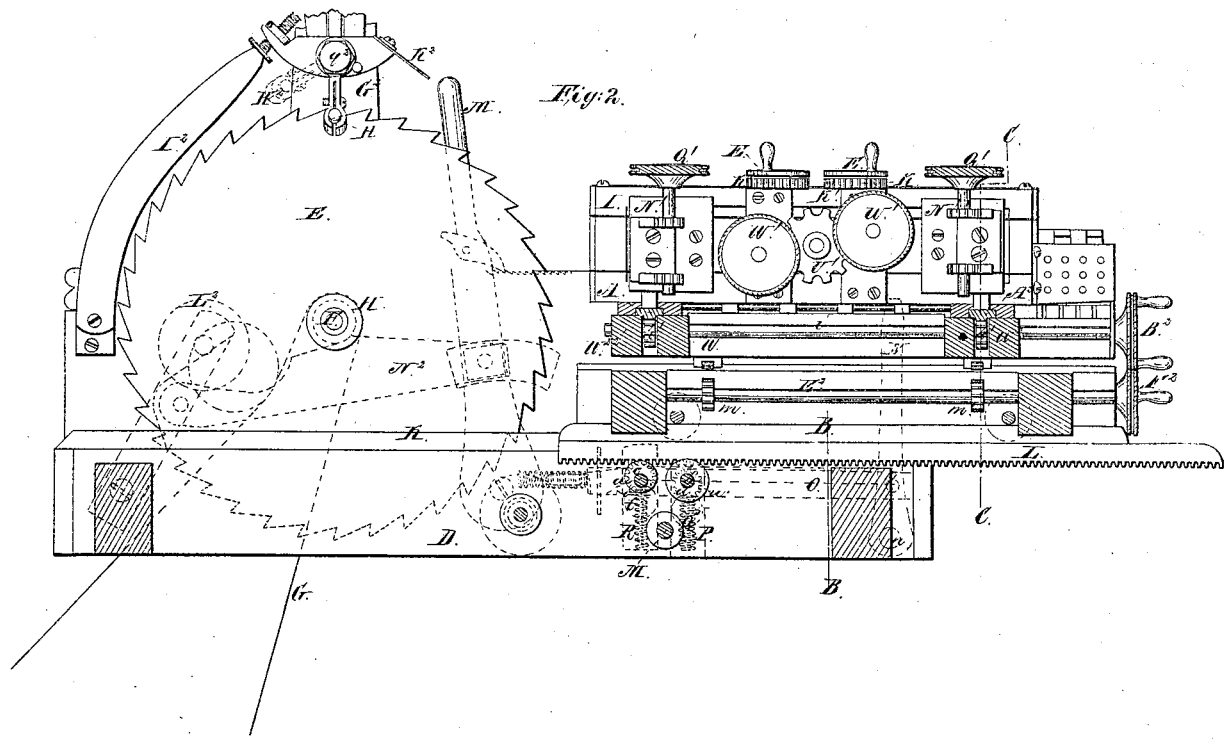

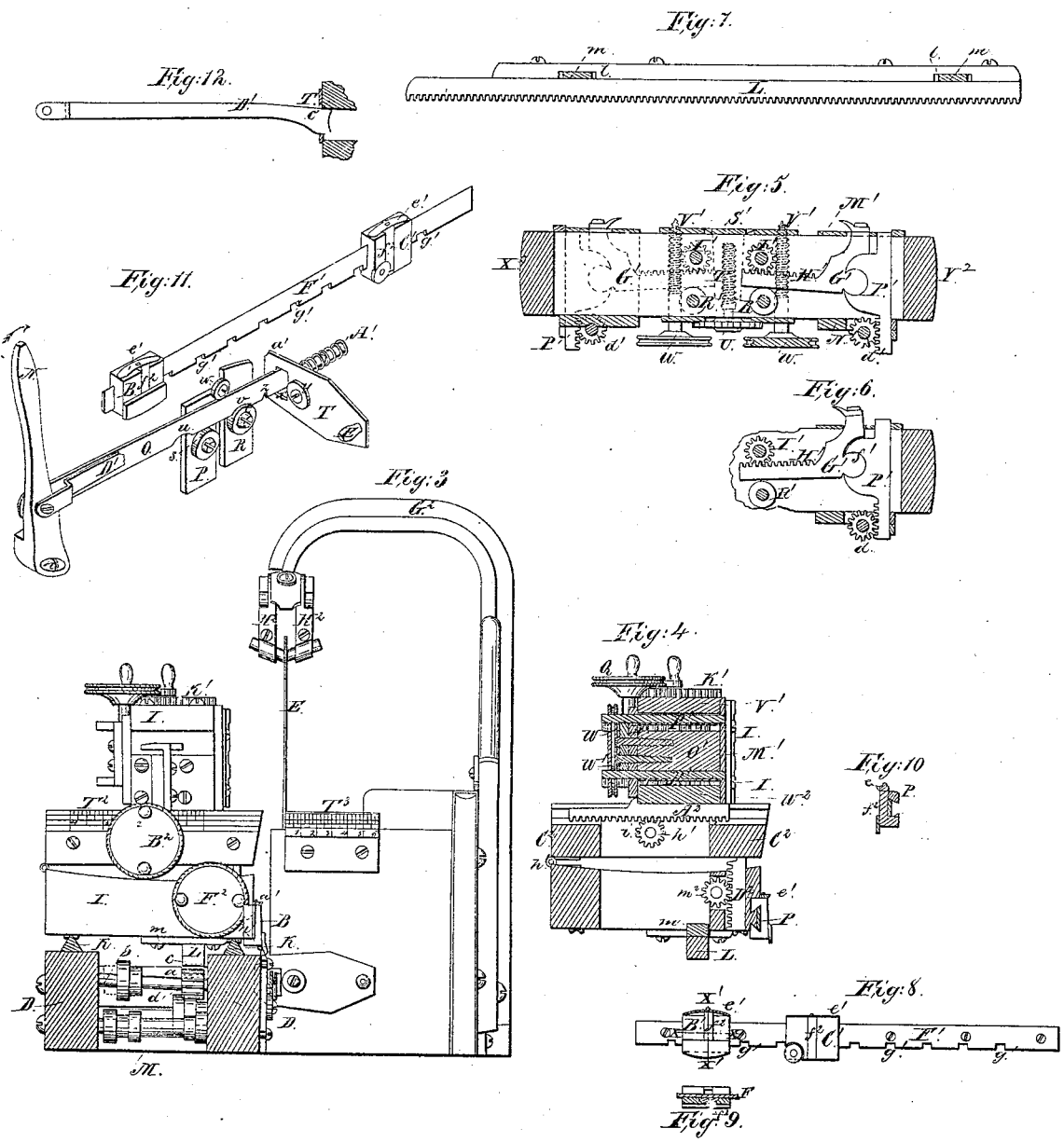

UNITED STATES PATENT OFFICE.

B. E. PARKHURST, OF BRUNSWICK, MAINE.

MACHINE FOR SAWING LUMBER.

Specification of Letters Patent No. 13,399, dated August 7, 1855.

*To all whom it may concern:*

Be it known that I, B. E. PARKHURST, of Brunswick, in the county of Cumberland and State of Maine, have invented certain new and useful Improvements in Machines for Sawing Lumber, of which the following is a full, clear, and exact description, reference being had to the annexed drawings, making part of this specification, in which—

Figure 1 is a plan; Fig. 2, a section on the line A A of Fig. 1; Fig. 3, a section on the line B B of Fig. 2, with the carriage moved forward; Fig. 4, a section on the line C C of Fig. 2; Figs. 5, 6, 7, 8, 9, 10, 11, 12, 13, details which will be referred to hereafter.

I will first describe the general features of my machine and then the details which form the subjects of my invention.

D is the framework of the machine.

E, the saw upon the shaft F, which is driven by the band G upon the pulley H.

I is the carriage to which the lumber is dogged, and which slides upon ways K and is moved back and forth in the following manner.

$a$ $b$ are transverse shafts bearing at one end the cog wheels $c$ and $d$, the ends of these shafts which carry the cog wheels being pressed up by springs Q, by which means the cog wheels are kept in contact with the rack bar L, when they are not otherwise thrown out of gear with the rack bar by means which will be hereafter described. The shafts $a$ and $b$ are revolved uninterruptedly in contrary directions by bands from pulleys on an intermediate shaft M. The rack bar L upon the bottom of the sliding carriage I has heretofore been attached rigidly thereto; in such case when the driving pinion was thrown suddenly into gear with it, its teeth or those of the pinion, were liable to be stripped before they were engaged with each other, on account of the great weight upon the carriage. To remedy this evil I have allowed the rack bar a slight longitudinal motion independent of the carriage, to which it is suspended, in the following manner—$l$ are mortises in the rack through which pass the bars $m$ attached to the bottom of the carriage, the width of the bars $m$ being less than the length of the mortises the rack bar is allowed a slight longitudinal motion before it starts the carriage; this motion allows the rack bar to engage fairly with the pinions $c$ $d$ before the latter are required to move the carriage, and thus the liability to break either the rack bar or the cog wheels is avoided.

I will now describe the manner in which the carriage is stopped and started.

N, Fig. 11, is a lever pivoted at $n$, seen in blue in Fig. 2.

O is a shipping rod pivoted to the lever N by the pin $p$ in a slot in shipping rod, so that the latter may have a slight motion independent of the lever N.

P (Fig. 13) is a stop forced upward by a spring Q, which serves as a bearing for one end of the transverse shaft $b$, which runs in the stop at $r$.

R is another stop arranged similarly with P, which carries the shaft $a$. The driving pinions $c$ and $d$ are thus engaged with, or disengaged from, the rack bar L by raising or depressing the stops P and R. This is accomplished by means of the shipping rod O; when the buttons $s$ and $t$ upon the stops, are beneath the circular excisions $u$ $v$ the stops rise and the pinions engage with the rack bar; at all other times the stops are depressed by the rod O, which is prevented from rising by the stationary roller $w$ against which its upper edge bears. The end of the shipping rod passes through a hole $x$ in a lever or plate T, pivoted at $y$, the rear end of which preponderates so as to force the plate into the notch $z$ of the shipping lever whenever the latter is thrown into a position to receive it, the rod O and lever N are forced out into the position seen in Fig. 11 by a spring A' in a cavity in the frame work. When the carriage is to be run out the lever N is moved in the direction of the arrow (Fig. 11) until the rod O comes into a position that shall enable the plate T to rise into the notch $z$ and lock the rod in position. When thus locked the stop R is depressed in the manner already described by the rod O, by which means the pinion C is disengaged from the rack bar L, and the pinion $d$ is engaged therewith, by which means the carriage is driven out until the dog B' strikes the lever T at $a'$, and depresses it out of the notch $z$, when the rod O is forced into the position seen in Fig. 11 by the spring A', by which means the driving pinion $d$ is disengaged from the rack bar and the pinion c, by which the carriage is gigged back is engaged therewith until the dog C' upon the other end of the carriage depresses the stop R and pinion c when the carriage stops.

The carriage may be gigged back any instant by hand in the following manner: It has been stated that the pin p passed through a slot in the rod O, that the lever N might have a slight motion independent of the rod.

D' is a bar of the form represented in Fig. 12, which is secured to the lever N, and moves with it. The end of this lever passes through the opening x in the lever T by the side of the rod O, and as the lever N is moved in the direction contrary to the arrow, (Fig. 11) the lever D', being prevented from rising by the frame work at c' (Fig. 12),—depresses the plate T, and releases it from the notch z, and the next instant the rod O is withdrawn, the stops P and R are thrown into the position represented in Fig. 11, and the carriage is gigged back. It will be perceived that the slot in the end of the rod O, permits this rod to remain stationary until the plate T is withdrawn from the notch z. The motion of the carriage may also be reversed by hand by raising the outer end of the plate T, by means of the handle E.

I will now describe the construction of the dogs B' and C'. These dogs slide upon the bar F' to which they are dovetailed, into the center of each of them is dovetailed a catch or bolt $f^2$, which is drawn up into one of the notches g' of the bar F', by the spring e'.

Fig. 8 is a front view of the bar F' and dogs; Fig. 9, a section at X—X; Fig. 10, a section at X' X'.

When it is desired to move the dog, the bolt f' is depressed against the action of the spring e', out of the notch g', when the dog may be readily moved and secured to another notch of the bar. The dogs are thus made instantaneously adjustable in any position in which they may be required.

The manner in which the lumber is dogged to the carriage will now be explained. The upper portion of the carriage to which the timber is dogged, is composed of the longitudinal timbers $V^2$, $W^2$, and the end pieces $X^2$, $Y^2$, (Figs. 4 and 5).

G' Figs. 5 and 6 are the dogs, attached to which are the racks H', which engage with the cogged wheels I', by which means the dogs are moved. The cog wheels I' are upon the shafts of the wheels K, which are driven by pinions on the shafts of the hand wheels L'. The shafts of the wheels, I', K', run in stationary bearings in the carriage, but the parts immediately connected with the dogs G', slide with them as follows: M' is a front plate; N', a rear plate, which are secured by screws or otherwise to a block O' (Fig. 4) which slides in the space between the timbers $V^2$, $W^2$.

P' is a guide which slides freely through the front and rear plates M' N', and is moved transversely of the carriage by the pinion d' upon the shaft of which is the hand wheel Q', by which the guide P' is moved. The guide P', pinion d', and hand wheel Q', are all carried by the sliding block O', and plates M', and N'. The dog G is connected with the guide P' by the circular joint f', which permits the dog to be thrown out and in by the hand wheel Q', and gear d', without disengaging the rack H' from the wheel I'. The rack is held up to this wheel by the roller R'. When the parts are thus constructed and arranged the dogs may be extended to a greater or less distance from each other to accommodate different lengths of logs, by operating the hand wheels L', at the same time that they may be moved out and in by the hand wheels Q'. In addition to these dogs, when the logs to be sawed are short I make use of a central stationary dog S', which is operated by the screw T', and hand wheel U'. When not in use this dog lies flush with the face of the carriage. When employed for sawing shingles two bolts are operated upon at a time, the inner end of each being alternately thrown in and out by the double dog to cut the butt and point alternately from each end.

It often happens when the logs are long that it is difficult to hold them with sufficient steadiness near the center. To accomplish this end I make use of the pointed screws V' which pass through the carriage and are operated by the hand wheels W'. These screws are forced into the rear of the log after it is dogged to the carriage, and its center is thus held steadily as required.

The portion of the carriage which carries the parts above described has upon its under surface rack bars $A^2$, which slide in dovetail ways in the timber $W^2$. These rack bars are actuated by the cog wheel h' on the shaft i' which is set in motion by the hand wheel $B^2$. The log is thus moved up to the saw as the operation proceeds.

$k^2$ are hinges by which the upper and lower portions of the carriage are connected together. The upper portion $C^2$ is alternately raised and lowered for the purpose of sawing clapboards and making other beveled cuts, by the vertical rack bar $D^2$, which is operated by cog wheels $m^2$ on the shaft $E^2$, and by the hand wheel $F^2$. When the machine is used for sawing clapboards, the upper portion of the carriage is alternately raised and depressed between each cut, a spring n' being allowed to spring into a suitable notch in the periphery of the wheel $F^2$, (Fig. 3) when the carriage is raised sufficiently high to give the required thickness to the clapboard.

To prevent the trembling of the saw I have invented a new method of steadying it as follows: $G^2$ is a bent arm secured to the frame work, to the extremity of which are attached the guides $H^2$, which are pivoted at the point $q^2$, so that should the log be of sufficient size to strike the guide, the latter will be moved thereby into the position seen in Fig. 2, out of the way of the log. It is evident that in such case its services would no longer be required as the saw would be held with sufficient steadiness in the kerf.

$I^2$, is a guard, the object of which is to clear the boards from the saw.

$K^2$ is a screw to intercept the saw dust thrown by the saw. The saw is driven by the band G, which is tightened by a pulley $L^2$, connected with the shipping lever $M^2$, by the lever $N^2$, seen dotted in Fig. 2.

Where circular saws are employed a considerable time is required for the saw to stop after the power is thrown off, and thus much time is lost each time the saw is stopped. To remedy this I have adopted the following expedient: When the tightening pulley $L^2$, is in the position shown in red in Fig. 2 the saw is driven. When the lever $M^2$ is moved so as to throw this pulley into the position seen in black in this same figure, the band is loosened and the saw is no longer driven, and at the same instant the lever $N^2$, is brought to bear forcibly against a wheel or pulley $S^2$, upon the shaft of the saw, by which means the motion of the latter is speedily arrested.

1, 2, 3, 4, are a series of bolts or catches, one of which is brought into operation in connection with the notched bars 5, 6, 7, 8, the notches of which are variously spaced from each other, by which means the motion of the log toward the saw is regulated according to the thickness of the material to be sawed.

$T^2$, $T^3$, are scales attached to the machine for the purpose of effecting the same object, which need not be further described.

With a machine constructed as above all kinds of building material, and dimension stuff may be sawed with accuracy and despatch.

What I claim as my invention and desire to secure by Letters Patent is—

1. The method herein described of connecting the rack bar to the carriage, so that the bar may have a slight motion independent of the carriage, for the purpose herein set forth.

2. I claim the dogs P, R, constructed and operated as described in combination with the notched bar F' whereby they may be instantly moved and set to accommodate them to different lengths of log as set forth.

3. I claim the within described method of connecting the dogs with their sliding guides P', whereby they may be operated longitudinally and transversely in the manner set forth.

4. I claim the pointed screw dogs V', V', operating in the manner substantially as herein set forth.

5. I claim the saw guide $H^2$, so constructed as to be thrown out of the way by the log in the manner set forth.

6. I claim the double dog S' which when out of use may be sunk flush with the surface of the head block, and may be run in and out in the manner described for the purpose of sawing the butt and point of shingles.

B. E. PARKHURST.

Signed in presence of—
 HENRY ORR,
 G. G. FROST.